Oct. 30, 1956
R. A. SALOMONE
2,769,151
BRANCH CIRCUIT PLUG-IN CONNECTOR
Filed Oct. 4, 1952
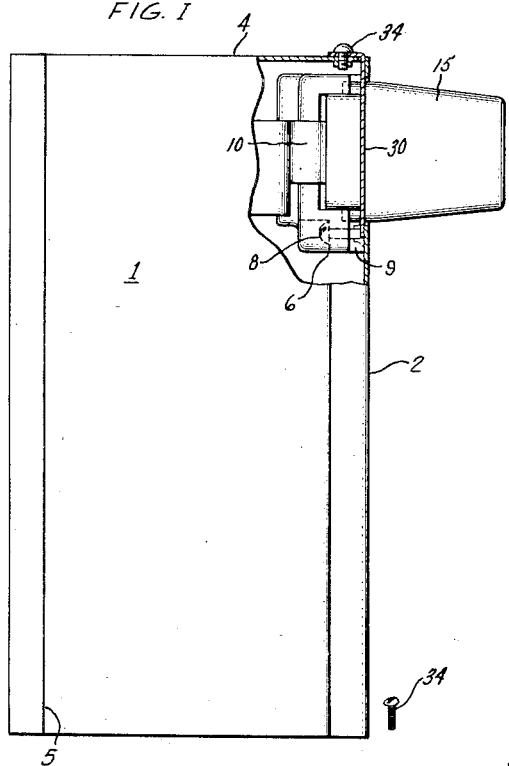
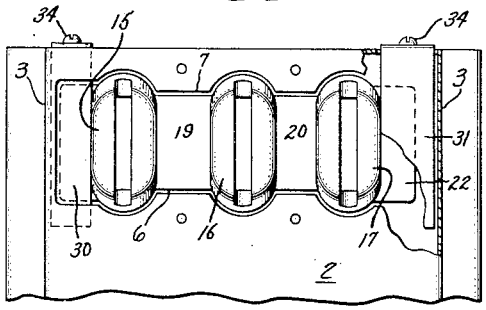
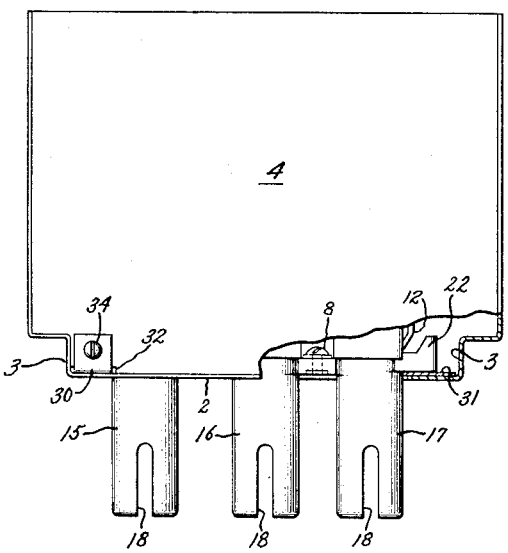
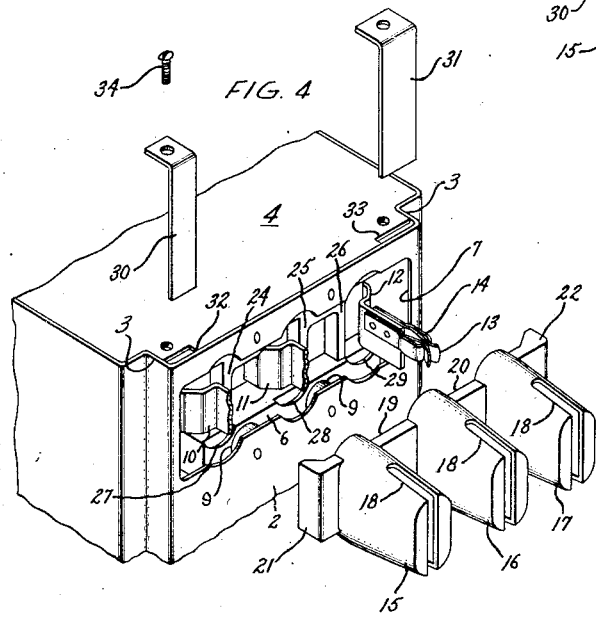
Inventor:
Rynold A. Salomone,
by Claude A. Mott
His Attorney.

United States Patent Office 2,769,151
Patented Oct. 30, 1956

2,769,151

BRANCH CIRCUIT PLUG-IN CONNECTOR

Rynold A. Salomone, Plainville, Conn., assignor to General Electric Company, a corporation of New York Application October 4, 1952, Serial No. 313,119

2 Claims. (Cl. 339—22)

My invention relates to branch circuit plug-in connectors for use with bus bar duct electric power distribution systems of the type having a plurality of bus bars mounted in electrically insulated parallel spaced relation in an enclosing duct or conduit.

As disclosed, for example, in Patent Number 2,317,710 to Anderson, such branch circuit plug-in connectors comprise a box in which is mounted suitable electric protective equipment for the branch circuit, such as a disconnecting switch, fuses, or a circuit breaker, and provided with a cover or door through which these devices are accessible. The protective devices in the box are connected electrically to the bus bars inside the distribution conduit by means of plug-in contact jaws, one for each bus bar, which project outwardly through openings in the back of the connector box far enough so that they may be connected to the bus bars by inserting the contact jaws through a suitable opening in the conduit into engagement with the bus bars.

As disclosed in the aforesaid Anderson patent, the contact jaws are electrically insulated by means of thin-walled cup-shaped shields made of electrically insulating material, preferably formed in one piece and provided with a base forming a flange which is inside the connector box and secured by screws passing through it to the inner wall of the box, the insulating shield assembly being put in place through the front of the box with the individual contact jaw shields projecting from the back of the box through openings in the back wall. Each shield is provided with a slot for receiving a bus bar which is engaged by the contact jaws. After the shield assembly has been mounted in place in the box, the fuses, switch, or other control equipment is mounted in the box.

One disadvantage of these devices is that when a shield breaks and must be replaced (the shields being subject to breakage and replacement by the user because of their necessarily thin-walled construction), it is necessary first to remove the control equipment. Moreover, the holes for the mounting screws weaken the base and often result in breakage at these points.

Accordingly, it is an object of my invention to provide a plug-in connector device having insulating contact jaw shields which are easily removable for replacement from the back of the box without disturbing the protective equipment in the box.

A still further object of my invention is the provision of simple and reliable means for securing or anchoring the shields in the box without the use of screws passing through the base portion of the shield.

In carrying out my invention in one form, I provide an enlarged opening in the back wall of the connector box, slightly larger than the common base for the plurality of insulating contact jaw shields, so that the base can be readily inserted through the opening into the box from the back of the box. The base is furthermore provided with a flange extension at each end which is inserted far enough into the box to provide for the insertion of metal securing straps, one for each flange, which are inserted through apertures provided for them in the top wall of the box and extend in engagement with the inner surface of the back wall and across the opening in front of the flanges. These straps are secured each by a screw and can readily be removed for removal of the insulating shield assembly. Moreover, for supporting the contact jaws and to position and support the base and shields, I provide an insulating block inside the box just in front of the aperture, which block is provided with recesses into which portions of the base fit.

For a more complete understanding of my invention, reference should be had to the accompanying drawing in which:

Fig. 1 is a vertical side view partly cut away disclosing a plug-in branch connector embodying my invention;

Fig. 2 is a fragmentary back view of Fig. 1 showing the insulating shields, but omitting the contact jaws for clarity;

Fig. 3 is a top plan view of Fig. 1 with a corner portion of the top wall broken away;

Fig. 4 is a fragmentary exploded view perspective of Fig. 1, the insulating shields and locking members being displaced.

Referring to the drawing, I have shown my invention in one form as applied to a branch circuit plug-in connector comprising a metallic box or enclosure 1 having a back wall 2 with vertical offsets 3 on opposite sides, a top wall 4 as seen in the drawing, bottom and side walls, and a front wall or cover 5. Inside the box are mounted suitable circuit protective devices (not shown) for the branch circuit, such as plug fuses, a disconnecting switch, or a circuit breaker.

For supporting the contact jaws, an insulating support 6 is mounted inside the box on the back wall 2 near the top and so as to extend over a transversely elongated aperture 7 in the back wall, the support 6 being secured to the back wall by means of screws 8 engaging tapped holes in the back wall of the box. Bosses 9 are provided on the back-side of the support 6 for the purpose of suitably spacing it from the back wall of the box as shown in Fig. 1.

Mounted on the support 6 in spaced relation with each other in a row crosswise with the box and extending through the opening 7 are three rigid electrically conducting straps 10, 11, and 12. The inner end portion of each of the straps 10, 11, and 12 is electrically connected to the electric protective equipment (not shown) within the box. The outer end portion of each of the straps projects from the aperture 7, and has attached to it by means of rivets at least one frictional electric contact shown as resilient contact jaws 13 (only one pair of which is shown) reinforced by spring strips 14. It will be understood that the pairs of contact jaws are spaced apart the same distance as the spacing between the power bus bars in the duct or conduit so that when the connector box is put in place on the duct with the contact jaws 13 extending through an opening in the wall of the duct, the contact jaws will engage and be forced onto the respective bus bars in the duct to form electric connections therewith for a branch circuit extending through the protective devices in the box and suitably insulated conductors extending from the protective devices through knockouts (not shown) in the wall of the box.

For the purpose of insulating the contact jaws 13 from each other, particularly when the connector box is removed with current flowing in the contact jaws and the branch circuit so that arcs are drawn between the contact jaws and the corresponding bus bars, as well as for providing mechanical protection for the contact jaws, cup-shaped enclosing shields 15, 16, and 17 are provided for the three contact jaws respectively, each of these shields being provided with a transverse slot 18 at its outer end to receive a bus bar. It will be understood that the slots 18 are parallel with each other and the contact jaws 13 are likewise parallel with each other and equally spaced apart the same distance as the bus bars in the power transmission duct. Preferably, as shown, the three shields are secured together to form a unitary shield assembly by bridging members 19 and 20 made of insulating material extending between the inner ends of the shields. Moreover, the outer sides of the shields 15 and 17 are provided with shoulder or flange projections 21 and 22, the connecting portions and flanges 19 to 22 inclusive being in alignment, as shown in Fig. 4, and together forming a cross-extending base portion.

As shown in Fig. 2, the aperture 7 in the back wall of the box conforms with the outline of the inner or base end of the insulating shield assembly and is slightly larger to provide for ready insertion of the base of the assembly through the aperture 7 into the box to the assembled position against the supporting insulator 6 shown in Fig. 1. Actually, as shown in Fig. 4, the supporting insulator 6 is provided with cross bars 24, 25, and 26 against which the base of the shield assembly is seated. These cross bars provide spaces between them for bends in the straps 10, 11, and 12. The insulator 6 is also provided with recesses 27, 28, and 29 below the straps 10, 11, 12, and similar recesses (not shown) above straps 10, 11, 12, in which portions of the ends of shields 15, 16, 17 respectively are seated.

In its assembled position, the outer surfaces of the flanges 21 and 22 are spaced a short distance from the plane of the inner surface of the back wall 2, as shown in Fig. 3, to provide a space for the ready insertion of two locking straps 30 and 31 through apertures or slots 32 and 33 provided for them in the upper wall 4 on opposite sides adjacent the back wall 2. As indicated in Fig. 1, each of these apertures 32 and 33 is formed by cutting away a portion of the top wall 4 to form a notch so that one side and one end of each aperture is formed by the back wall 2 and offset side walls 3. Therefore, the locking straps 30 and 31 have their back-sides in engagement with the inner surfaces of the back wall 2 and extend downward across the aperture 7 behind the flanges 21 and 22, as shown in the drawing, thereby to secure the contact jaw shield assembly in place on the box. As shown in Fig. 2, the inner edges of the locking straps are in closely fitting relation with the adjacent outer sides of the shields 15 and 17 while their outer edges engage the side walls 3 of the box thereby to secure the shield assembly in the desired position longitudinally of the aperture 7 as well as to secure the shield assembly to the box. Preferably the upper ends of the straps 30 and 31 are bent over at right angles and secured to the upper wall 4 by screws 34, as shown.

With this arrangement, it will be observed that the shields are secured firmly in place and can be removed quickly and easily for repairs or replacement by simply removing the screws 34 and pulling out the straps 30 and 31. The shield assembly can then be freely removed from the back through the aperture 7 and a new one as freely put in place and secured by means of the straps 30 and 31, without disturbing the insulating support 6.

While I have described only certain preferred embodiments of the invention by way of illustration, many modifications will occur to those skilled in the art, and I, therefore, wish to have it understood that I intend in the appended claims to cover all such modifications as fall within the true spirit and scope of the invention.

What I claim as new and desire to secure by Letters Patent of the United States is:

1. A branch circuit plug-in connector for bus duct electric power distribution systems comprising walls forming an enclosure including a back wall provided with an aperture, an insulating support mounted in said enclosure behind said aperture, electrical connecting elements mounted on said insulating support and projecting through said aperture outwardly of said enclosure, a shield of insulating material surrounding each of said projecting electrical connecting elements and provided with slots in its outer end to receive bus bars and having an enlarged base portion in engagement with said insulating support so as to limit entry of said shield into said aperture, said aperture in said wall being large enough to permit the insertion and removal of said enlarged base portion of said shield from outside said enclosure through the said aperture, a wall of said enclosure being provided with apertures on opposite sides and adjacent to said back wall, and removable locking straps in said apertures extending along the inner surface of said back wall and across a portion of said aperture to reduce the effective size of said aperture and overlying a portion of said base of said shield thereby to secure said shield to said enclosure.

2. A branch circuit plug-in connector for bus duct electric power distribution systems comprising walls forming an enclosure including a back wall provided with an aperture, a support mounted in said enclosure behind said aperture, electrical connecting elements mounted on said support and projecting through said aperture outwardly of said enclosure, a shield of insulating material adapted to fit over said electrical connecting element and having an enlarged base portion in engagement with said support so as to limit entry of said shield into said aperture, said aperture in said wall being large enough to permit the insertion and removal of said enlarged base portion of said shield from outside said enclosure through said aperture, said enclosure being provided with apertures adjacent to said back wall, and removable locking straps in said apertures extending along the inner surface of said back wall and across a portion of said aperture to reduce the effective size of said aperture and overlying a portion of said base of said shield thereby to secure said shield to said enclosure.

References Cited in the file of this patent

UNITED STATES PATENTS

| Number | Name | Date |
|---|---|---|
| 1,909,270 | Guett | May 16, 1933 |
| 2,160,713 | Bentley | May 30, 1939 |
| 2,192,587 | Harvey | Mar. 5, 1940 |
| 2,317,710 | Anderson | Apr. 27, 1943 |
| 2,487,900 | Sopher | Nov. 15, 1949 |